United States Patent [19]

Popper et al.

[11] 4,055,675

[45] Oct. 25, 1977

[54] PREPARATION OF PUFFED FRUIT

[75] Inventors: Karel Popper, Danville; William G. Schultz, El Cerrito; Wayne M. Camirand, Albany; Earl Hautala, Martinez; George H. Robertson, Berkeley; Ladell Crawford, Richmond; Bernard J. Finkle, Berkeley, all of Calif.

[73] Assignee: The United States of America as represented by the Secretary of Agriculture, Washington, D.C.

[21] Appl. No.: 750,324

[22] Filed: Dec. 13, 1976

[51] Int. Cl.² ............................................. A23L 1/212
[52] U.S. Cl. .................... 426/470; 426/615; 426/640; 426/447; 426/465; 426/473
[58] Field of Search ............... 426/615, 640, 445, 447, 426/465, 473, 518, 520, 393, 524, 384, 385, 444, 443, 470, 665, 621, 625, 449, 450; 62/63, 64, 373

[56] References Cited

U.S. PATENT DOCUMENTS

| 1,725,171 | 8/1929 | Anderson | 426/447 X |
| 2,124,746 | 7/1938 | Plews | 426/449 |
| 3,007,319 | 11/1961 | Ogden | 62/64 |
| 3,368,363 | 2/1968 | Alaburda et al. | 426/524 X |
| 3,408,209 | 10/1968 | Eskew et al. | 426/447 |
| 3,833,747 | 9/1974 | Cording et al. | 426/447 X |

Primary Examiner—Arthur L. Corbin
Attorney, Agent, or Firm—M. Howard Silverstein; David G. McConnell; Theodore J. Leitereg

[57] ABSTRACT

Bite-size pieces of fruit are prepared by a process wherein the fruit is partially dehydrated, puffed, and then heated to obtain a crisp outer surface thereon. The fruit is puffed by immersing it in a pool of liquid carbon dioxide under pressure and then rapidly releasing the pressure.

1 Claim, No Drawings

PREPARATION OF PUFFED FRUIT

FIELD OF THE INVENTION

This invention relates to and has among its objects the provision of novel food products and methods for making the same. Further objects of the invention will be evident from the following description wherein parts and percentages are by weight unless otherwise specified.

DESCRIPTION OF THE PRIOR ART

Snack items have become a way of life in America and are being consumed in ever-increasing quantities by all age groups. One problem, however, is that most snack items have very low nutritional value. Consequently, even though Americans consume large quantities of foods, poor nutrition lurks as a serious threat to the health of the people. Snack foods with high nutritional content offer a convenient way to combat poor nutrition.

SUMMARY OF THE INVENTION

It is an object of the invention described herein to provide a food product with good nutritional balance as well as an appealing flavor. It is a further object of the invention to provide a procedure for preparing such a food item. The products of the invention are eminently suited for snacking. They have an attractive appearance, appealing taste, and their size permits quick and easy handling and consumption. In addition, the products of the invention have a further advantage in that they can be combined with other foods, for example, cereals, desserts, milk and milk products, etc.

The objects of the invention are obtained by dehydrating bite-size pieces of fruit and immersing them in a pool of liquid carbon dioxide under pressure. The pressure is rapidly released causing the fruit to become puffed. The so-treated pieces are then treated to form a crisp outer surface thereon.

DESCRIPTION OF THE PREFERRED EMBODIMENTS

In the following description, attention is directed to the production of a snack food from golden raisins. It is important to note that raisins are a partially dehydrated fruit. The invention can be practiced on fruits of all kinds. However, if the fruit contains its natural content of water, it must be dehydrated to a moisture level of about 10-50%, depending on the nature of the fruit, prior to applying the procedures of the invention thereto. The moisture level to be used for any one particular fruit can be determined by pilot trials in accordance with the process of the invention. Any conventional dehydration technique, either natural or artificial, can be used.

As mentioned above, the following description is directed to the production of a snack food from golden raisins. This particular embodiment of the invention is by way of illustration, not limitation. In its broad ambit the invention is applicable to small (about ½ inch in diameter) fruits of all kinds, such as cranberries, blueberries, lingonberries, grapes, gooseberries, blackberries, strawberries, currants, cherries, ordinary raisins, and the like. It should be obvious that when these items are partially dehydrated, their size will be decreased. Ordinarily, partially dehydrated fruits on which the invention may be practiced, are about ¼ to ½ inch in diameter.

It is also within the compass of the invention to produce snack items from larger fruits, such as pears, peaches, apples, oranges, lemons, limes, apricots, tangellos, nectarines, plums, bananas, tangerines, pineapple, etc. In this particular embodiment of the invention it is first necessary to cut the larger fruits into bite-size pieces. In general, cubes of approximately ½ inch are preferred in order to make the snack bite-size and thus suitable for eating out of hand. Again, it should be noted that these pieces must be partially dehydrated prior to application of the invention thereto.

The practice of the invention on golden raisins is next described in detail. Since raisins already have a reduced moisture level (about 16-18%), they need not be dehydrated further before subjecting them to the remaining steps in the process of the invention.

In accordance with the instant process the raisins are contacted solely with liquid carbon dioxide. At ambient temperature and pressure carbon dioxide is a gas; thu, liquid carbon dioxide exists only under pressure. Typically, for purposes of the invention the pressure of the liquid carbon dioxide is maintained at 900–1000 psig. For convenience, contact with the liquid carbon dioxide is conducted at ambient temperature. Generally, one uses about 0.1 to 10 parts of liquid carbon dioxide per part of food material, although the proportions are not critical. The conditions, such as proportion of materials, temperature, and pressure, may be varied slightly to suit individual circumstances.

In a preferred embodiment of the invention the raisins are immersed in a pool of liquid carbon dioxide. The raisins are placed in a vessel, from which air is removed by appropriate means, e.g., evacuation and the like. The vessel should be constructed to operate at pressures in the range of 900 to 1000 psig. Liquid carbon dioxide is fed into the vessel at a convenient rate until a volume commensurate with the amount of raisins to be treated is reached. At this point the vessel is sealed and the contents held under a pressure of about 900–1000 psig for about 0.5 to 6 hours.

After the contents have been immersed in liquid carbon dioxide, the pressure is released as quickly as possible. Usually, approximately 10 to 20 minutes is required; but this time depends on the amount of carbon dioxide used in the treatment. It should be obvious that the pressure should not be released so fast as to cause the contents to be swept from the container. As a result of this gradual release of pressure, the raisins become puffed, i.e., expanded to about three times their original size. The puffing effect is produced as the carbon dioxide, which becomes gaseous at ambient pressure, escapes from the immersed raisins. After the carbon dioxide has been released from the vessel, the raisins are recovered therefrom.

Following this puffing, a crisp outer layer is formed on the surface of the raisin. To this end, the puffed raisins are heated until the surface thereof attains the desired level of crispness. Heat may be applied to the raisins according to conventional techniques. For example, the puffed raisins may be heated in a circulating air oven at a temperature of about from 70° to 90° C for a period of about 1 to 24 hours. Following application of heat to produce a crisp surface, the raisins are cooled and are ready for consumption.

The raisins produced in accordance with the invention exhibit a crisp exterior and soft interior and an excellent flavor. It is important to note that a fresh raisin flavor is retained in the product. In addition, there is an excellent combination of sweetness and tartness not found in the raisins prior to treatment. The puffed raisins are ideally suited for eating out-of-hand. However, as mentioned earlier, they also can be combined with cereals, desserts, and the like. The raisins produced in accordance with the invention may be stored for extended periods of time without deleterious effects on flavor and texture.

It is a further advantage of the invention that the nutritional value of the fruit is not reduced by the procedures employed. Thus, the products of the invention not only have a desirable flavor, but also contain many valuable nutrients necessary for a balanced diet.

It is a particular advantage of the products of the invention that the surfaces thereof are not sticky. Thus, when packaged, individual pieces will not stick together. In addition, consumption is easier since the pieces will not stick to the fingers.

EXAMPLE

The invention is further demonstrated by the following illustrative example.

Into a 10-liter pressure vessel was placed 2 kg. of golden raisins. The vessel was evacuated and 2 l. of liquid carbon dioxide was allowed to flow into the vessel, which was then sealed to prevent loss of gaseous carbon dioxide. The contents of the vessel were held at a pressure of 900 psig for 6 hours, the raisins sitting in a pool of liquid carbon dioxide.

After 6 hours had passed, the pressure was released over a 10-minute span. As a result of this treatment the raisins were puffed to about three times their normal size and exhibited a light gold-yellow color and soft texture.

The puffed raisins were placed in a circulating air oven wherein they were heated at 80° C for 1 hour. Upon cooling, the puffed raisins retained the above color and developed a crisp surface. The so-produced raisins had an excellent flavor and texture.

Having thus described our invention, we claim:

1. A process for preparing a food product from bite-size pieces of fruit, which consists of the steps of
    a. partially dehydrating the fruit to a moisture content of about 10–50%,
    b. contacting the dehydrated fruit solely with liquid carbon dioxide at ambient temperature for about from 0.5–6 hours, said liquid carbon dioxide being maintained under a pressure of about 900–1000 psig,
    c. rapidly releasing the pressure to puff the fruit, and then
    d. heating the puffed fruit at about 70°–90° C for 1–24 hours to form a crisp outer layer on the surface of the puffed fruit.

* * * * *